United States Patent [19]

Miller et al.

[11] 4,280,062
[45] Jul. 21, 1981

[54] AUXILIARY LIGHT WIRING HARNESS

[75] Inventors: Richard R. Miller, Milwaukee; Edward A. Simi, Menomonee Falls, both of Wis.

[73] Assignee: Douglas Dynamics Inc., Milwaukee, Wis.

[21] Appl. No.: 68,874

[22] Filed: Aug. 22, 1979

[51] Int. Cl.³ .............................................. H02B 1/20
[52] U.S. Cl. ................................ 307/10 LS; 361/428; 315/83; 340/89
[58] Field of Search ......................... 307/10 R, 10 LS; 339/28, 29 R, 29 B; 361/428; 174/72 A; 200/51 R, 51.02–51.05; 315/82, 83; 340/76, 92, 89

[56] References Cited

U.S. PATENT DOCUMENTS

| | | | |
|---|---|---|---|
| 3,174,576 | 3/1965 | Woofter | 174/72 A |
| 3,671,955 | 6/1972 | Malekzadeh | 315/83 |
| 3,836,415 | 9/1974 | Hilderbrandt | 307/10 R |
| 4,017,772 | 4/1977 | Burnside | 361/428 |
| 4,051,383 | 9/1977 | Dola | 307/10 LS |

*Primary Examiner*—Gerald P. Tolin

[57] ABSTRACT

An auxiliary light wiring harness for use with a vehicle headlight system including an existing vehicle plug connected to a vehicle headlight power source. The harness includes a three prong plug adapted for connection to the existing vehicle plug, a pair of female plugs adapted for connection to a pair of vehicle headlights, and auxiliary connectors adapted for connection to a pair of auxiliary headlamps. The harness also includes wires connected to the three prong plug, the pair of female plugs and the auxiliary connectors, and a six pole two position switch connected to the wires and operable to allow an operator to energize the vehicle headlights or the auxiliary headlamps.

7 Claims, 1 Drawing Figure

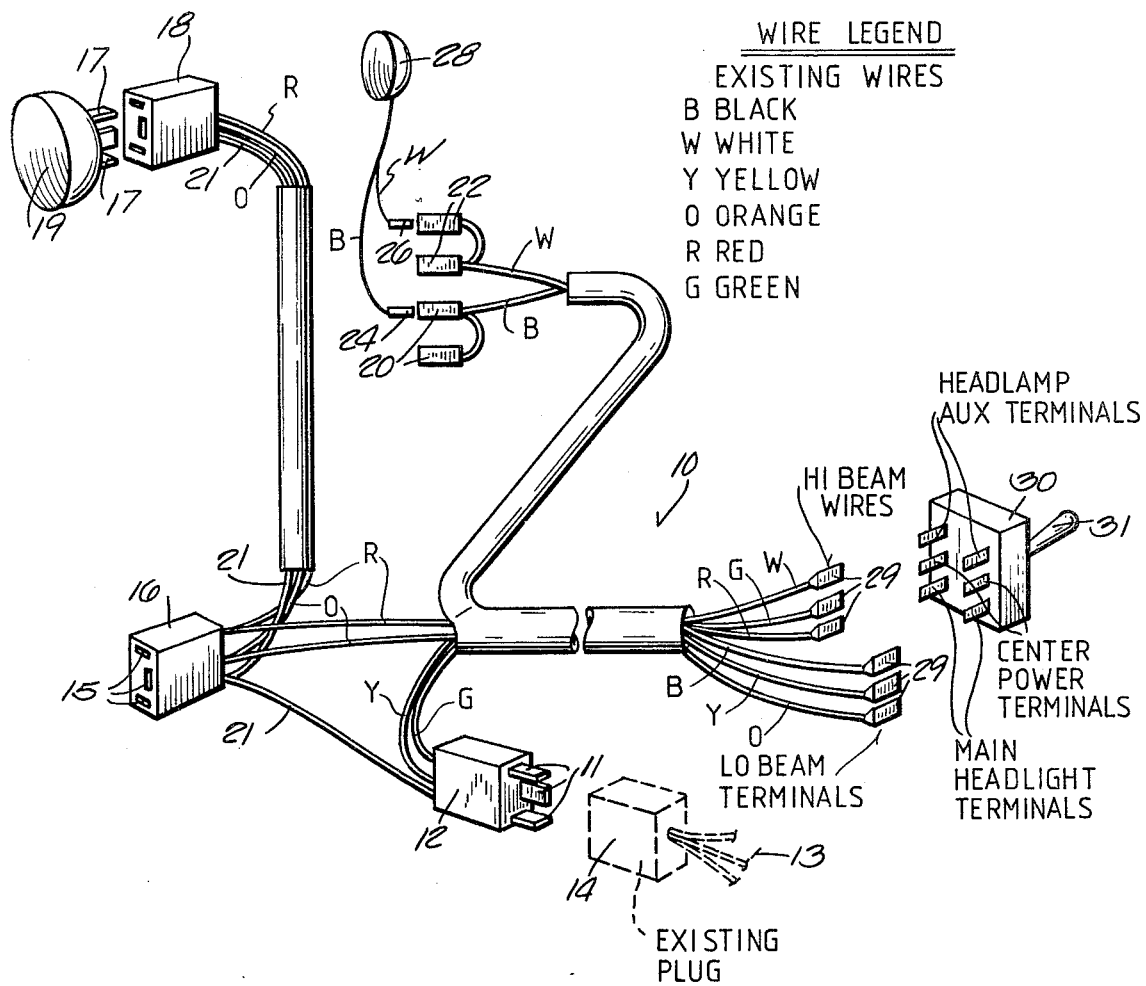

AUXILIARY LIGHT WIRING HARNESS

BACKGROUND OF THE INVENTION

The invention relates to wiring arrangements utilized to electrically connect auxiliary lights into an existing vehicle headlight system.

Attention is directed to U.S. Pat. No. 4,017,772 which discloses a turn signal wiring replacement harness, and to U.S. Pat. No. 3,890,836 which discloses an automatic temperature control system analyzer for an automobile.

Heretofore, in order to connect auxiliary lights into an existing vehicle headlight system, it has been necessary to cut or splice into the wires of the existing headlight system. Connecting auxiliary light wires by tapping into existing headlight wiring is time consuming and difficult, and can cause the failure of the auxiliary lights or the original headlight system if the wrong wires are tapped into, or if the tapped wire connections are faulty or come undone.

This invention is concerned with this general area, and has among its objects to provide an auxiliary light wiring harness which can be simply connected to a portion of an existing vehicle headlight system in order to eliminate the above noted and other disadvantages of prior art auxiliary light wiring arrangements.

SUMMARY OF THE INVENTION

In order to achieve the foregoing and other objects, the invention provides an auxiliary light wiring harness for use with a vehicle headlight system including an existing vehicle plug connected to a vehicle headlight power source. The wiring harness includes first connector means adapted for connection to the existing vehicle plug for establishing an electrical connection to the vehicle headlight power source, second connector means adapted for connection to a vehicle headlight, third connector means adapted for connection to an auxiliary light, and conductor means or wires connected to the first, second, and third connector means. The wiring harness also includes switch means connected to the conductor means and operable for selective movement between a first position wherein the conductor means electrically connects the first and second connector means so that the vehicle headlight is energized, and a second position wherein the conductor means electrically connects the first and third connector means so that the auxiliary light is energized.

In the preferred construction, the first connector means is a male plug, the second connector means includes two female plugs adapted for connection to a pair of vehicle headlights, and the third connector means includes a pair of female connectors adapted for connection to the male connectors of a pair of auxiliary headlamps. The conductor means preferably includes three pair of wires which are respectively connected to the male plug, the female plugs, and the female connectors, and the switch means preferably is a six pole two position switch having three pairs of terminals connected to the three pairs of wires so that an operator can actuate the switch to energize either the vehicle headlights or the auxiliary headlamps.

BRIEF DESCRIPTION OF THE DRAWINGS

The sole FIGURE is a diagrammatic exploded view of an auxiliary light wiring harness which embodies various of the features of the invention.

DESCRIPTION OF THE PREFERRED EMBODIMENT

Shown in the drawing is an auxiliary light wiring harness, generally designated 10, which includes first connector means adapted for electrical connection to an existing vehicle plug connected to a vehicle headlight power source (not shown). As illustrated, the first connector means preferably takes the form of a male plug 12 having three electrical contacts or prongs 11, and which is connected to a corresponding female plug 14 included in an existing vehicle headlight harness, generally designated 13. The existing vehicle headlight harness 13 is indicated by dashed lines and is only partially shown.

The harness 10 also includes second connector means, preferably in the form of a pair of female plugs 16 and 18, each including three sockets 15 which are adapted for electrical connection to the prongs 17 of original vehicle headlights 19 (one headlight 19 shown). In order to allow for connection to auxiliary headlamps, the harness 10 also includes third connector means, preferably in the form of pairs of female connectors 20 and 22, which are adapted for electrical connection with a pair of auxiliary headlamps 28 (one headlamp 28 shown). As shown in the illustration construction, the female connectors 20 and 22 are adapted for connection with male connectors 24 and 26 of the auxiliary headlamps 28.

The harness 10 also includes conductor means, preferably in the form of first, second, and third pairs of wires. The six wires which make up the conductor means are color coded and are identified by the colors specified in the Wire Legend as illustrated in the drawing. The first pair of wires includes the green and yellow wires connected to the male plug 12, and which are connected to the high beam and low beam wires, respectively, of the existing vehicle headlight harness when the male plug 12 is connected to the existing vehicle plug 14. Another pair of wires includes white and black wires connected to the female connectors 20 and 22, respectively. The last pair of wires includes red and orange wires which are connected as shown to the female plugs 16 and 18. A ground wire designated 21 is connected between the male plug 12 and the female plugs 16 and 18, and corresponds to the ground connection of the existing headlight harness 13. The ground connections of the auxiliary headlamps 28 are not shown for purposes of clarity. In addition to the connections described above, each of the six wires also includes an end having a clip 29 which is adapted to be connected to an appropriate one of the terminals of a switch, also included in the wiring harness 10.

More particularly, the wiring harness 10 includes switch means connected to the conductor means or six wires, and the switch means preferably takes the form of a six pole two position switch 30. The switch means or switch 30 is operable for selective movement between a first position wherein the conductor means electrically connects the first and second connector means so that the vehicle headlights are energized, and a second position wherein the conductor means electrically connects the first and third connector means so that the auxiliary headlamps are energized.

More specifically, as illustrated and labelled, the six pole two position switch 30 includes a toggle switch 31 and three pairs of terminals including headlamp auxiliary terminals, center power terminals, and main headlight terminals. The switch 30 is operative so that when the toggle switch 31 is moved to a first or upper position, the white and black wires connected to the headlamp auxiliary terminals are connected to the center power terminals of the switch, which center terminals are connected to the green and yellow wires of the vehicle headlight power source so that the auxiliary headlights are energized. Similarly, when the auxiliary switch 30 is moved to a second or down position, the red and orange wires connected to the main headlight terminals of the switch 30 are connected to the center power terminals of the switch so that the original vehicle headlights are energized and operate in a normal fashion.

Operation of the switch 30 allows a vehicle operator to select either the original vehicle headlights 19 or the auxiliary headlamps 28. The dimmer switch of the vehicle can be used to select either low beam or high beam, and the vehicle high beam indicator operates in the normal fashion for either the vehicle headlights or auxiliary headlamps. If desired, other switch means arrangements could be utilized. For example, the switch 30 could comprise a three position center-on switch allowing an operator to turn on both the auxiliary headlamps and main headlights at the same time.

In order to install the wiring harness 10, the portion of the original headlight wiring harness (not shown) connected to the existing vehicle plug 14 and connected to the vehicle headlights is disconnected. The male plug 12 of the wiring harness 10 is then connected to the existing vehicle plug 14 and the female plugs 16 and 18 of the wiring harness 10 are connected to the vehicle headlights. The auxiliary headlamps 28 are connected to the female connectors 20 and 22 of the wiring harness 10 as shown, so that operation of the switch 30 allows selection of either the vehicle headlights or the auxiliary headlamps.

It is to be understood that the invention is not confined to the particular construction and arrangement of parts as herein illustrated and described, but embraces all such modified forms as thereof that come within the scope of the following claims.

We claim:

1. An auxiliary light wiring harness for use with a vehicle headlight system including an existing vehicle plug connected to a vehicle headlight power source, said wiring harness comprising;
    first connector means adapted for connection to said existing vehicle plug for establishing an electrical connection to the vehicle headlight power source,
    second connector means adapted for connection to a vehicle headlight,
    third connector means adapted for connection to an auxiliary light,
    conductor means connected to said first, second, and third connector means, and
    switch means connected to said conductor means and operable for selective movement between a first position wherein said conductor means electrically connects said first and second connector means so that the vehicle headlight is energized, and a second position wherein said conductor means electrically connects said first and third connector means so that the auxiliary light is energized.

2. An auxiliary light wiring harness in accordance with claim 1 wherein said conductor means comprises a first pair of wires connected to said first connector means, a second pair of wires connected to said second connector means, and a third pair of wires connected to said third connector means, and wherein said switch means is connected to said first, second, and third pair of wires and operable for selective movement between a first position wherein said first and second pairs of wires are connected so that the vehicle headlight is energized, and a second position wherein said first and third pairs of wires are connected so that the auxiliary light is energized.

3. An auxiliary light wiring harness in accordance with claim 2 wherein said second connector means comprises a pair of female plugs adapted for respective connection to a pair of vehicle headlights, said third connector means comprises pairs of connectors adapted for connection to a pair of auxiliary headlamps, and wherein when said switch means is moved to said first position, the pair of vehicle headlights is energized, and when said switch is moved to said second position, the pair of auxiliary headlamps is energized.

4. An auxiliary light wiring harness in accordance with claim 3 wherein the existing vehicle plug is connected to the high beam and low beam wires of the vehicle headlight power source,
    wherein said first connector means comprises a plug adapted for connection to said existing vehicle plug for establishing electrical connections to said high beam and low beam wires,
    wherein said first pair of wires is connected to the high beam and low beam wires, and
    wherein said switch means comprises a six pole switch including a pair of auxiliary headlamp terminals connected to said third pair of wires, a pair of center power terminals connected to said first pair of wires, and a pair of main headlight terminals connected to said second pair of wires, and wherein when said switch moves to said first position, said pair of auxiliary headlamp terminals and said pair of center power terminals are connected so that the auxiliary headlamps can be energized by the vehicle headlight power source through either the high beam wire or low beam wire, and a second position wherein said center pair of power terminals and said pair of main headlight terminals are connected so that said pair of vehicle headlights can be energized by the vehicle headlight power source through either the high beam wire or the low beam wire.

5. An auxiliary light wiring harness in accordance with claim 4 wherein said first connector means comprises a three prong male connector adapted for connection to an existing female vehicle plug, and wherein said second conductor means comprises a pair of female plugs adapted for respective connection to a pair of vehicle headlights.

6. An auxiliary light wiring harness for use with a vehicle headlight system including an existing vehicle plug connected to the high beam and low beam wires of a vehicle headlight power source, said wiring harness comprising;
    a first plug adapted for connection to the existing vehicle plug for establishing electrical connections to the high beam and low beam wires,
    a pair of female plugs adapted for respective connection to a pair of vehicle headlights,
    pairs of connectors adapted for respective connection to a pair of auxiliary headlamps,
    a first pair of wires connected to said first plug, a second pair of wires connected to each of said female plugs,
a third pair of wires connected to each of said pairs of connectors, and
a six pole two position switch means including a pair of auxiliary headlamp terminals connected to said third pair of wires, a pair of center power terminals connected to said first pair of wires, and a pair of main headlight terminals connected to said second pair of wires, said switch means operable for selective movement between a first position wherein said pair of auxiliary headlamp terminals and said pair of center power terminals are connected so that the pair of auxiliary headlamps can be energized by the vehicle headlight power source through either the high beam wire or low beam wire, and a second position wherein said pair of center power terminals and said pair of main headlight terminals are connected so that the pair of main headlights can be energized by the vehicle headlight power source through either the high beam wire or low beam wire.

7. An auxiliary light wiring harness in accordance with claim 6 wherein said first plug comprises a male plug adapted for connection to an existing female vehicle plug connected to the high beam and low beam wires of a vehicle headlight power source.

* * * * *